Patented Mar. 3, 1936

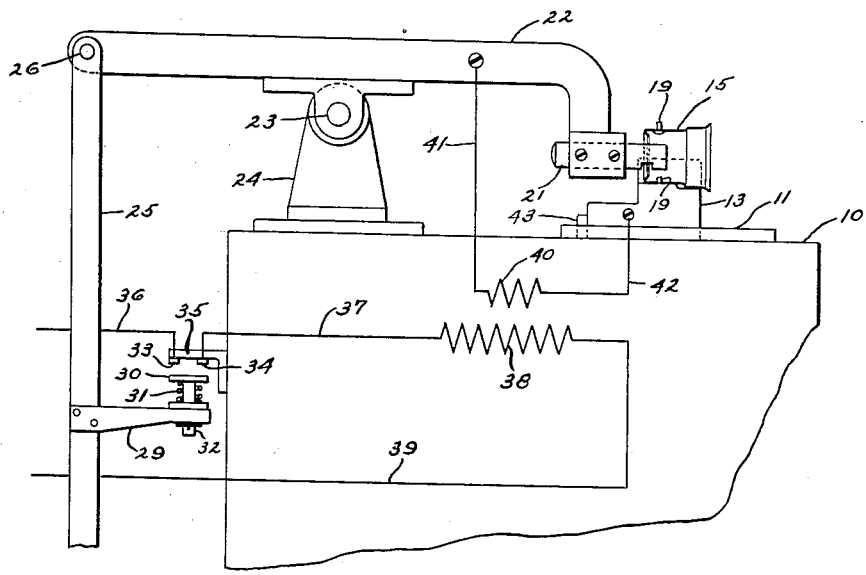
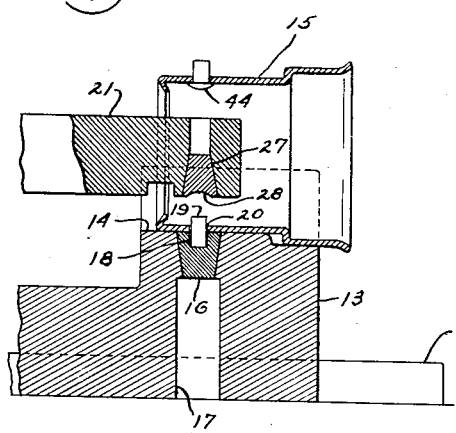
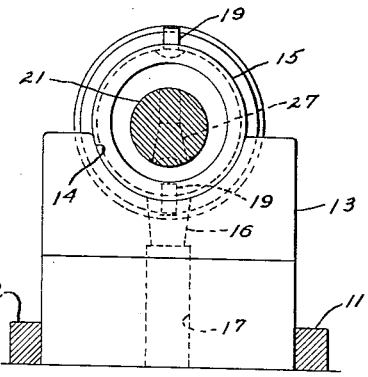

2,032,990

UNITED STATES PATENT OFFICE 2,032,990

MANUFACTURING WELDED ARTICLES

Arnold Kollhof, Spandau-West, Germany, assignor to General Electric Company, a corporation of New York Application July 11, 1933, Serial No. 679,958
In Germany August 5, 1932

1 Claim. (Cl. 219—2)

My invention relates to methods and apparatus for manufacturing welded articles and more particularly to methods and apparatus for welding "bayonet" pins to bases for electric lamps and similar devices.

The bayonet pins in electric lamps and similar devices have heretofore been attached to the metal base shell by upsetting the ends thereof. This practice has been unsatisfactory due to the fact that the pins were often not rigidly attached and became loosened in use. According to my invention these disadvantages are obviated by providing a method and apparatus for welding the pins to the base shell. The said apparatus comprises a block-shaped electrode having a concave seat therein in which the base shell is supported. A second stud-shaped electrode is provided on a movable arm and is inserted in said base shell. The block-shaped electrode has an insert of highly refractory metal having a hole therein in which the pin is inserted through a hole in the base shell. The second electrode also preferably carries an insert which has a concave surface which forms a rivet head on the pin when it is brought in contact therewith. During the heating of the rivet the shank portion is compressed by the said second electrode so as to fill up the hole in the insert. The size of the pins is thus accurately controlled and fixed by the said hole in said insert, which is an important factor in the proper insertion of lamps having such pins on their bases. Further features and advantages of my invention will appear from the following detailed description thereof.

In the drawing, Fig. 1 is an elevation of apparatus comprising my invention; Fig. 2 is a detailed elevation in section, and to a larger scale, of the welding electrodes; and Fig. 3 is a front view thereof.

Referring to the drawing, the apparatus comprises a frame or bed 10 having a pair of guide rails 11, 12 between which is mounted a horizontally reciprocating block-shaped welding electrode 13. The electrode 13, which is preferably made of copper, has a semi-circular seat 14 therein in which a cylindrical base shell 15 is placed. A conical insert 16 of refractory metal such as tungsten or molybdenum is located in the electrode 13 with the top thereof flush with the bottom of the seat portion 14. A hole 17 is provided in the electrode 13 under the insert 16 to allow easy removal thereof. A hole 18 is provided in the insert 16 to receive a pin 19 which projects through a hole 20 in the base shell 15.

A stud-shaped electrode 21 is disposed above the electrode 13 and enters the shell 15 during the welding operation. Said electrode 21 is mounted on an arm 22 which is pivotally mounted on a pin 23 in a block 24 on the bed 10. A vertically reciprocating arm 25 is mounted on a pin 26 in the end of the arm 22 so that electrode 21 may be moved up and down with respect to electrode 13. A conical insert 27 is mounted in the electrode 21 in vertical alignment with insert 16 and has a concave surface 28 which forms a head on the pin 19. A contact arm 29 is provided on the arm 25 and carries a contact plate 30 which is resiliently supported by a spring 31 surrounding a pin portion 32 mounted in the end of said arm 29. Said plate 30 engages a pair of contacts 33, 34 on an arm 35 on the bed 10. Contact 33 is connected to a line 36 which extends to a source of electrical energy, while contact 34 is connected to a line 37 which extends to one end of a primary coil 38 of a transformer, the other end of which is connected to a line 39. The secondary coil 40 of said transformer is connected to the arm 22 and the electrode 13 by lines 41, 42 respectively. The forward motion of electrode 13 is arrested by a stop 43 when the inserts 16, 27 are in vertical alignment.

In operation, the electrode 13 is moved back, or to the right in Fig. 1, a pin 19 is placed in the hole 18 in insert 16, and a base shell 15 is placed over pin 19 in the seat portion 14. The electrode 13 is then moved forward to the stop 43. The arm 25 is now moved upward so that contact plate 30 engages contacts 33, 34 and the concave portion 28 of insert 27 in electrode 21 engages the top of pin 19, thereby closing the welding circuit. The pin 19 is heated to plasticity so that the shank portion thereof fills up the hole 18 in insert 16 and the top portion thereof is formed into a head 44 and welded firmly to the base shell 15. The pin 19 will not be welded to the refractory inserts 16, 27 during the brief duration of the operation which takes only a few seconds. The arm 25 is then moved downward, thus lifting the electrode 21 up, and electrode 13 is moved to the right and the second pin welded in the same manner.

Instead of reciprocating the eletrode 13, it is of course possible to arrange electrode 21 so that it reciprocates into and out of the shell 15.

What I claim as new and desire to secure by Letters Patent of the United States, is:

The method of uniting a bayonet pin to a metal base shell which consists in assembling said shell and an electrode with an aperture in said shell in line with a recess of definite size in said electrode and with a pin passing through said aperture and extending into said recess, then causing another electrode to engage the inner end of said pin and supplying electrical energy to fuse the said end and to weld the head thus formed to the inner surface of said shell and expand the shank portion of said pin into said recess in said first-mentioned electrode.

ARNOLD KOLLHOF.